June 2, 1936.                J. HEINRICH                2,043,170
                           AIR COOLED ENGINE
                           Filed Nov. 8, 1934
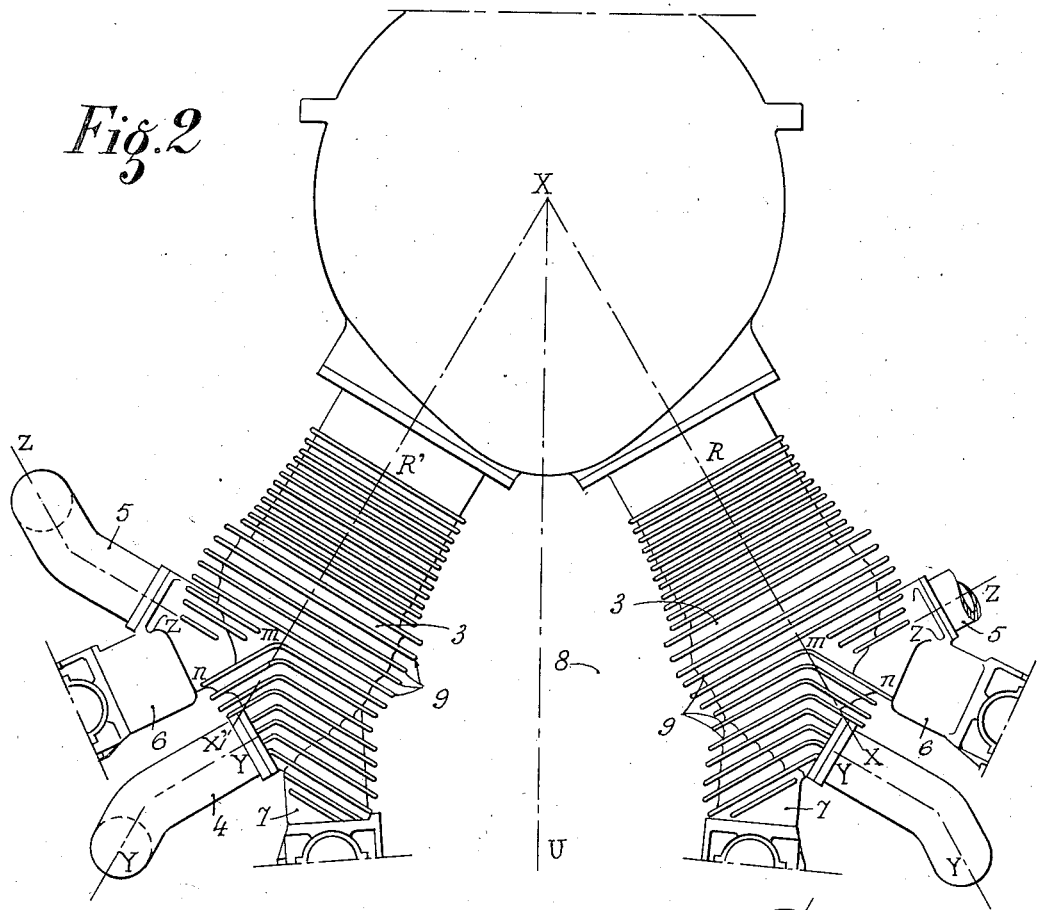
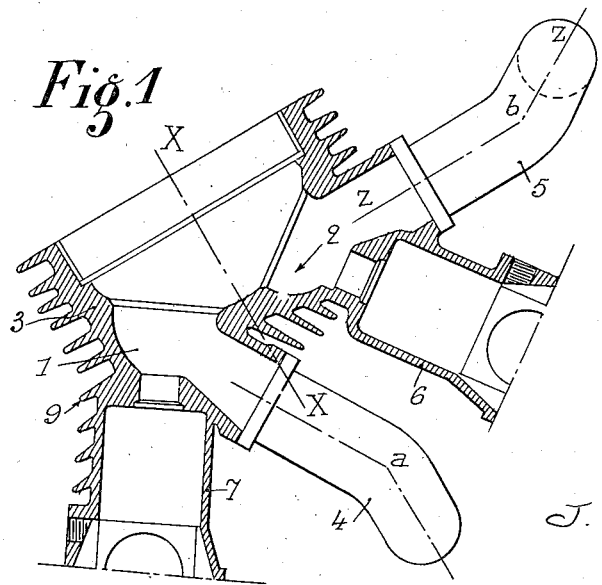
J. Heinrich
INVENTOR
By Glascock Downing & Seebold
                              Attys.

Patented June 2, 1936

2,043,170

UNITED STATES PATENT OFFICE 2,043,170

AIR COOLED ENGINE

Jean Heinrich, Paris, France, assignor to Société des Moteurs Salmson, Paris, France Application November 8, 1934, Serial No. 752,141
In France November 28, 1933

2 Claims. (Cl. 123—171)

The present invention has for its object improvements in engines of the internal combustion type, or the like, and it consists more particularly in a special arrangement of the cylinder head of the air-cooled type, in order on one hand to prevent the admission device from being heated by the exhaust device and on the other hand to further the cooling of the exhaust device.

The engine according to the invention is chiefly characterized by the fact that the admission parts, with the admission conduits, on the one hand, and the exhaust parts, with the exhaust conduits, on the other hand, are quite separate, and are situated in different zones of the cylinder head, while assuring in the first place the circulation of the air or other cooling fluid around the exhaust device and the highly heated points of the cylinder head.

In the accompanying drawing, which is given solely by way of example:

Fig. 1 is a section of a cylinder head according to the invention, the plane of said section passing through the axes of the valves of the cylinder head.

Fig. 2 is an elevational view showing two adjacent cylinders, in the case of an engine having two rows of cylinders in V-arrangement.

According to the embodiment shown in Fig. 1, the exhaust valve chamber or neck 1 and the admission valve chamber or neck 2 are located on opposite sides of the longitudinal axis X—X of the cylinder head 3. The exhaust conduit 4 and the admission conduit 5 are respectively connected to the exhaust and admission chambers or necks 1 and 2. The axis Y—Y of conduit 4 and the axis Z—Z of conduit 5 diverge when proceeding from the cylinder head. These conduits 4 and 5 are bent at $a$ and $b$ in contrary directions, in order to further increase the distance between said conduits. Again, between these conduits is situated the housing 6, adapted to contain the stem of the admission valve and its control mechanism. The exhaust conduit 4 is situated between the said housing 6 and the analogous housing 7 used for the exhaust valve.

It is apparent that the hot exhaust parts are completely separated from the admission parts and consequently said admission parts are heated to a minimum degree by said exhaust parts.

Obviously, the exhaust parts are located in such manner as to be the first to be passed over by the cooling air. In the case of an aircraft engine of the V type, for example, such as the one represented in Fig. 2, it is a known fact that the cooling air draft produced by the propeller or by the displacement of the aeroplane is sent, by suitable guiding means, well known in the art and not represented as forming a part of the invention, into the V-shaped channel 8, formed between the two rows of cylinders R—R' and exhausted laterally of the cylinder rows. In such an engine, the exhaust parts are thus placed next the plane of symmetry X—U of the engine, the admission parts, on the contrary, being placed at the exterior.

This arrangement affords a very clear separation between the parts of the cylinders which are at a high temperature, and the adjacent parts. These parts at high temperature are located in the interior of the V channel, and the fresh air cools in the first place the parts which surround the exhaust valves, and it circulates between the flanges 9 before cooling the parts of the cylinder head which are next the admission valve, which, being in contact with the fresh gas, are much less heated.

It should be noted that the cooling flanges 9 situated on each exhaust device are curved at $m$, $n$ in such manner as to deflect the streams of air which proceeding from the channel 8 circulate between them and become heated, and thus such streams will not afterwards pass along the admission device.

Having now described my invention what I claim as new and desire to secure by Letters Patent is:

1. In an air-cooled internal combustion engine, a cylinder, only one admission neck and only one exhaust neck on the cylinder head, an extension formed on said head and constituting a thermal screen between said necks, and cooling fins on said head having portions directed substantially at right angles to the axis of said cylinder on the side of said cylinder head opposite that of said admission neck and portions extending in the space between said exhaust neck and said admission neck so as to form continuous channels surrounding substantially said exhaust neck on all sides for deflecting the streams of cooling air through the space between said necks.

2. In an air-cooled internal combustion engine, a cylinder, only one admission neck and only one exhaust neck on the cylinder head, an extension formed on said head constituting a thermal screen between said necks, said screen forming a casing for the intake valve control means, and cooling fins on said head having portions directed substantially at right angles to the axis of said cylinder on the side of said cylinder head opposite that of said admission neck and portions extending in the space between said exhaust neck and said admission neck so as to form continuous channels surrounding substantially said exhaust neck on all sides for deflecting the streams of cooling air through the space between said necks.

JEAN HEINRICH.